Jan. 9, 1968  J. H. McHUGH  3,362,451
INTEGRAL PNEUMATIC TIRE AND WHEEL CONSTRUCTION
AND METHOD OF MAKING THE SAME
Filed Nov. 26, 1965  3 Sheets-Sheet 2
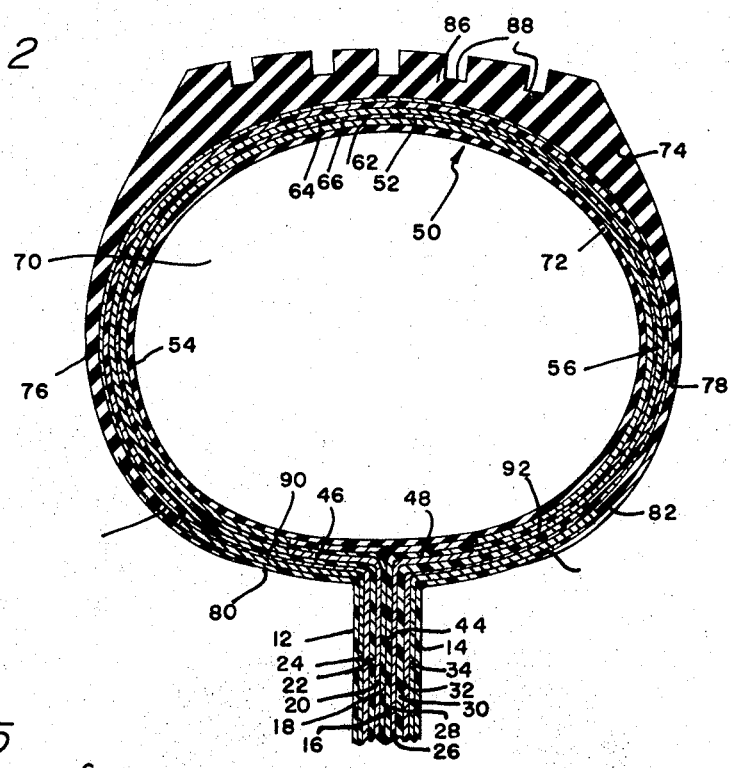
FIG. 2
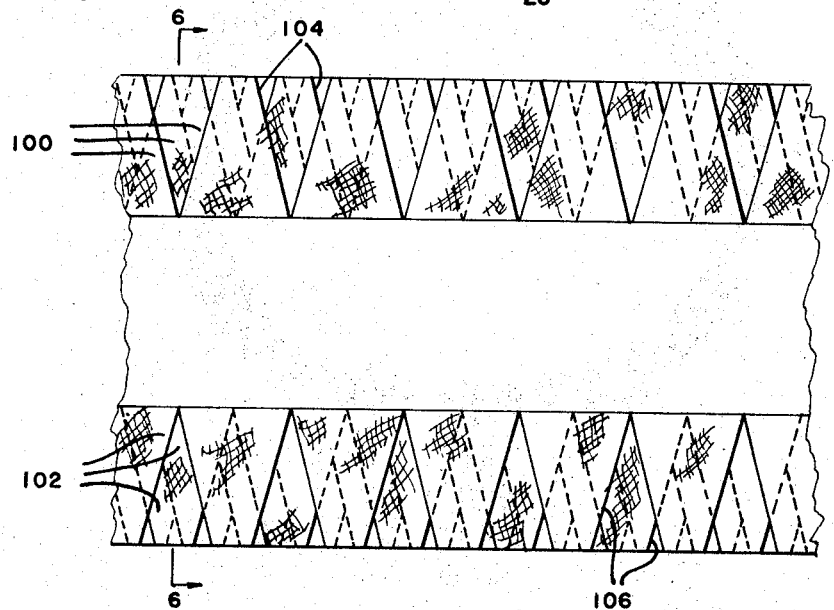
FIG. 5
FIG. 6
INVENTOR.
JAMES H. McHUGH
BY
Robert E. Breidenthal
ATTORNEY Jan. 9, 1968  J. H. McHUGH  3,362,451
INTEGRAL PNEUMATIC TIRE AND WHEEL CONSTRUCTION
AND METHOD OF MAKING THE SAME
Filed Nov. 26, 1965  3 Sheets-Sheet 3

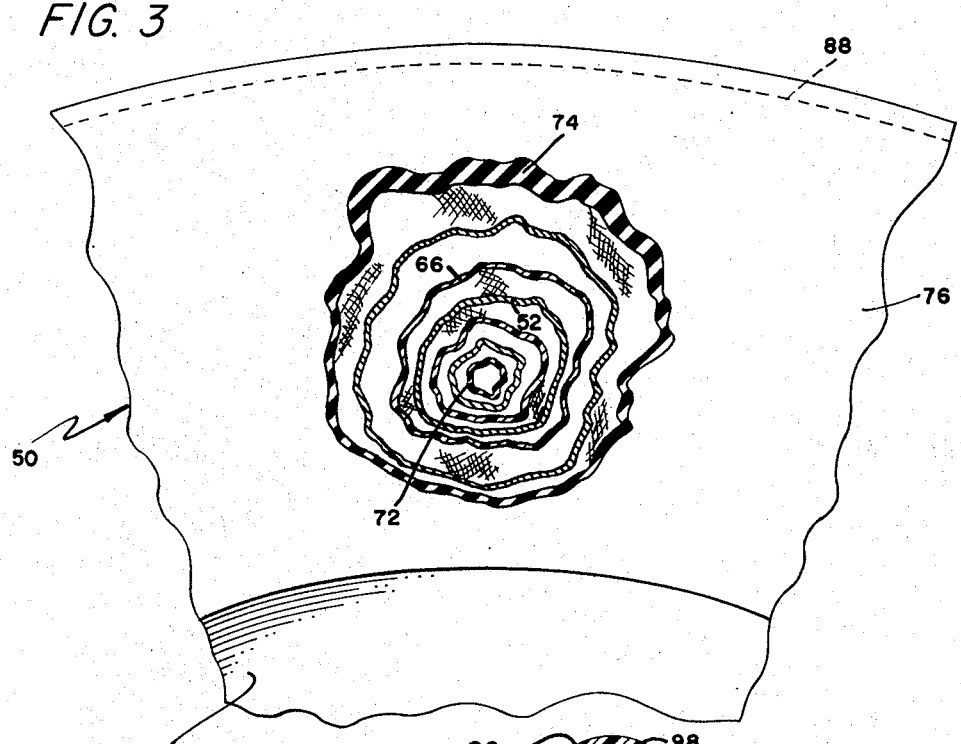
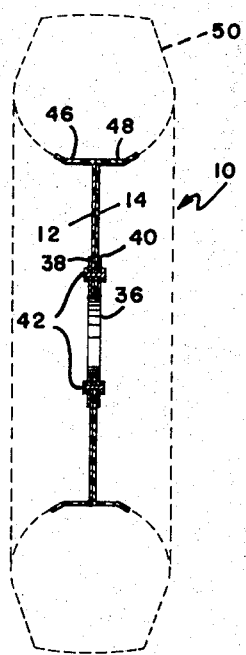
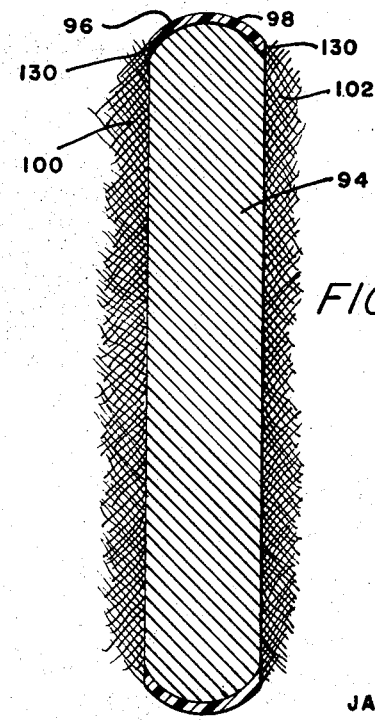

INVENTOR.
JAMES H. McHUGH
BY
Robert E. Breichenthal
ATTORNEY

United States Patent Office 3,362,451
Patented Jan. 9, 1968

3,362,451
INTEGRAL PNEUMATIC TIRE AND WHEEL CONSTRUCTION AND METHOD OF MAKING THE SAME
James H. McHugh, 408 S. Belmont,
Wichita, Kans. 67218
Filed Nov. 26, 1965, Ser. No. 509,730
6 Claims. (Cl. 152—360)

ABSTRACT OF THE DISCLOSURE

A unitary pneumatic tire, rim and wheel of molded construction wherein the rim has embedded therein extensions of fabric disposed in the tire body disposed in the wheel. The construction can be made by a procedure that involves molding the tire body with fabric embedded therein projecting from both of the opposite rim edges of the tire body, then molding one half of the rim and wheel and fabric embedded therein to one rim edge of the tire body and to the fabric projecting from such rim edge of the tire body, and finally, with an inflated bladder in the tire body, molding the other half of the rim and wheel to the other rim edge of the tire body and the fabric projecting therefrom.

---

This invention relates to new and useful improvements in pneumatic tires and methods of making the same, and more particularly relates to an integral pneumatic tire, rim and wheel construction and methods of making the same.

Generally speaking, the present invention involves new and useful improvements in structure and methods with respect to the prior art as exemplified by U.S. Patent No. 3,062,254 which issued to Keefe, Nov. 6, 1962, on Molded Wheel Having Internal Reinforcing; U.S. Patent No. 3,117,614 which issued to Amici, Jan. 14, 1964, on Combined Pneumatic Tire and Rim Assembly; and U.S. Patent No. 3,047,041 which issued to Bottasso et al., July 31, 1962, on Pneumatic Tire With Integral Rim.

The primary object of the present invention is to provide a unitary pneumatic tire, rim and wheel construction fabricated entirely by molding techniques, and wherein such portions of the structure constituting elements termed rim portions or rim flanges of conventional construction have embedded therein extensions of tire body or tire carcass fabric ply materials as well as extensions of bonded or embedded fabric in the wheel to achieve optimized strength in the connection of the tire body to the rim and the latter to the wheel.

Another important object of the invention is to provide a construction such as specified above which will require a minimum of materials in the sidewall portions of the tire body or carcass so as to minimize the generation of heat during sidewall flexure occasioned during tire usage.

Another important object is to reduce the overall cost of a pneumatic tire, rim and wheel to such a low level that it is economical to replace such an entire assembly upon the tire portion thereof wearing out, and to thereby enable enjoyment of the economy of avoidance of such tasks as the mounting of a new tire upon a rim, etc.

Still another object of the invention is to provide an integral pneumatic tire, rim and wheel construction such that the same can be marketed as an assembly that is pre-balanced from both the static and dynamic standpoints.

One aspect of the invention involves an integral pneumatic tire and wheel construction comprising an annular wheel having an integral peripheral rim, said wheel and rim being comprised of a fabric of high tensile strength fibers bonded by a plastic or resin material and of sufficient resilient strength and rigidity to support substantial radial and axial static and shock loads presented thereto, said rim including opposite and laterally extending portions generally conformable in configuration to a torus embracing the wheel and terminating in marginal edges, an annular tire body constituted of fabric ply layers embedded in and bonded to elastomeric sealing material, said tire body being C-shaped in section and having marginal edge portions, said marginal edge portions of the tire body abutting the marginal edges of the rim whereby the tire body and the rim generally conform to the torus and enclose a torus-shaped space in an airtight fashion, said fabric ply of the tire body being extended from each of the abutting marginal edge portions of the latter and being securely embedded in the resin bonding material of the oppositely extending portions of the rim, and an elastomeric tire tread material bonded on the radially outermost side of the tire body.

Another aspect of the invention involves in the method of making an integral pneumatic tire and wheel, the steps comprising radially superposing and sealing together with an impregnating elastomer and central portions of a series of fabric ply layers to form an integral annular multi-ply tire body having the lateral side margins of the fabric ply material freely extending therefrom, positioning the lateral side margins of the fabric material at one side of the tire body in a mold cavity definitive of an annular semi-rim and wheel shape, positioning annular layers of fabric material in the mold cavity to overlap said side margins of the fabric ply material at said one side of the tire body, filling the mold cavity with a curable resin and curing said resin to form a semi-rim and wheel integral with the tire body at said one side of the latter, positioning the thus formed tire body having the side margins of the fabric material extending from the other side thereof and the integral semi-rim and wheel at said one side thereof in an annular mold cavity and about an inflatable torus-shaped bladder, positioning annular layers of fabric material in the last mentioned mold cavity to overlap the last mentioned side margins of fabric material, placing a curable resin in the last recited mold cavity externally of the bladder and about the fabric material at said other side of the tire body, inflating the bladder by insertion of a fluid under pressure thereinto, and curing the resin while the bladder is inflated.

An important feature of the invention resides in fabric ply material of the tire body or carcass being embedded in a cured resin constituting effectively a rim so as to achieve a secure and integral connection between the tire body or carcass and the rim and at the same time to effect reinforcement of the synthetic resin constituting the rim, and so that any provision of structure analogous to the conventional bead of pneumatic tires is avoided.

Another important feature of the invention is the provision of an integral rim and wheel with each of such portions of the structure being constituted of a cured synthetic resin which may include fiber reinforcement such as comprised of fibers of glass, nylon, and the like. While not being absolutely essential, it is much preferred as a feature of this invention that the fiber reinforcement be woven as a fabric, with it being especially preferred that that such reinforcement be in the nature of laminations of glass fiber fabric or textile impregnated and bonded together in a compact mass with a synthetic resin such as an epoxy resin.

Still another feature of the invention resides in overlapping annular layers of fabric ply material with the fabric ply layers that extend about the center of the tire to strengthen the tire with respect to radial stresses as well as with respect to loads applied to the tire in a tangential direction such as occur during acceleration and deceleration of a vehicle provided with such tire.

Other important features of the invention relate to steps performed during manufacture of the integral pneumatic tire, rim and wheel construction of this invention with particular importance being attached to the two-step molding of the opposite sides of the rim and wheel, with the second step being performed with the tire being inflated by the injection of a fluid under pressure into an inflatable bladder disposed therein.

These and other objects, aspects and features of the invention will become evident and fully appreciated in the light of the following description of a preferred embodiment of the invention and methods of making the same when taken in conjunction with the accompanying drawings, wherein:

FIGURE 1 is a vertical sectional view taken in the plane of the axis of the structure with the pneumatic tire portion thereof being illustrated in dashed outline;

FIGURE 2 is an enlarged fragmentary sectional view taken in the plane of the axis of the construction and along a radius thereof and illustrating particularly the pneumatic tire portion, the rim portion and adjacent portions of the wheel;

FIGURE 3 is a fragmentary side elevational view of the structure of this invention on an enlarged scale and with portions thereof being broken away to illustrate in section and relationship of various layers of material incorporated in the same;

FIGURE 4 is a vertical sectional view of a preliminary state in the fabrication of the structure, the view being taken upon the plane of the axis of the construction;

FIGURE 5 is an enlarged fragmentary illustration of the layers of bonded fabric ply material disposed about the mold or form shown in section in FIGURE 4;

FIGURE 6 is a transverse sectional view taken upon the plane of the section line 6—6 in FIGURE 5;

Figure 8:
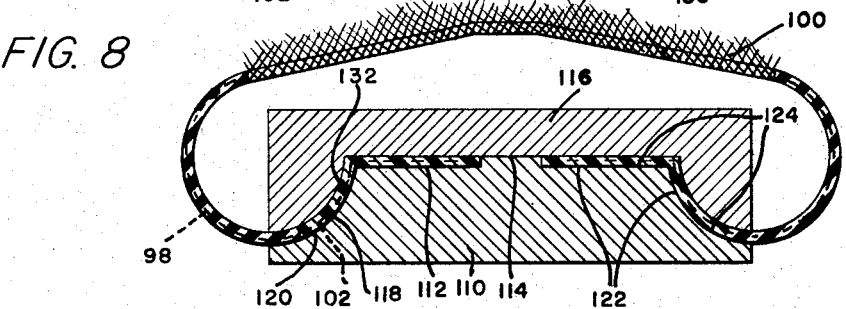
Figure 9:
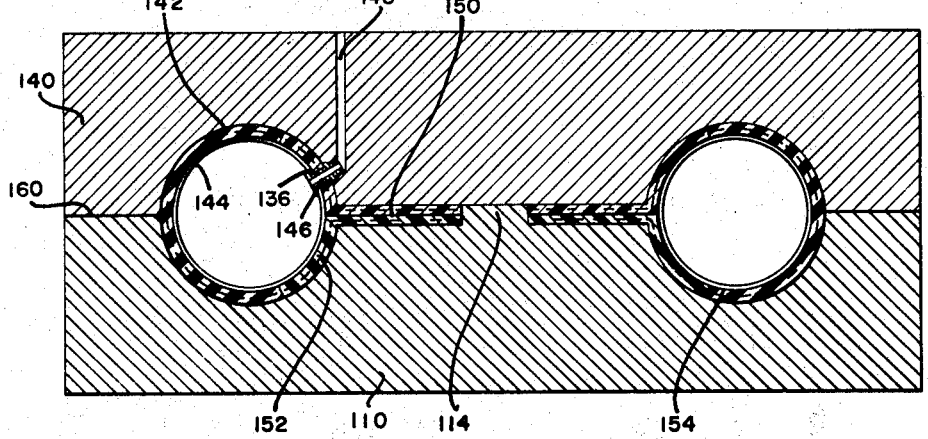

FIGURE 8 is a central sectional view taken upon the plane of the axis of the structure and illustrating in particular the molds employed to define a mold cavity and wherein a synthetic resin is formed and cured to constitute a portion of the rim and wheel construction with fabric ply material of the tire body extending into and embedded within such synthetic resin; and FIGURE 9 is a sectional view taken upon the plane of the axis and showing an ensuing step of fabrication wherein the other portion of the rim and wheel construction is molded and cured from a synthetic resin with fabric ply material embedded therein:

Referring now to the drawings wherein like numerals designate like parts throughout the various views, the reference numeral 10 designates the integral pneumatic tire, rim and wheel construction generally. The integral construction 10 will be seen upon reference to FIGURES 1 through 3 to comprise a pair of annular plates or wheel portions 12 and 14 which are of corresponding radial extents and are comprised of a cured thermo setting resin material characterized by being hard and resilient in the interests of toughness, strength and resistance to heat such as for example suitable forms of epoxy and phenolic resins, and preferably the resin material of the wheel portions 12 and 14 include embedded therein fibrous reinforcing material which can conveniently be for example glass, nylon, or metallic fibers such as of steel or non-ferrous metal. It is highly preferred that the resin material be reinforced with a fabric woven of such fibers (glass fibers being preferred in this role). Insofar as is now known best results can be obtained by the wheel portions 12 and 14 each being constituted of a laminated structure formed by layers of fabric of woven glass fibers impregnated by and bonded together by the resin as a compact mass. Such laminated structure of the plates 12 and 14 is illustrated in FIGURE 2 wherein the numerals 16, 18, 20, 22 and 24 designate resin bonded layers or laminations of fabric woven of fibers of glass constituting the plate 12. Correspondingly, the plate 14 includes similar bonded laminations 26, 28, 30, 32 and 34. More or less laminations can be employed as will be evident. This aspect of the invention will be readily understood by those skilled in the art as it is conventional to include as reinforcement such materials in synthetic resins such as commonly referred to as epoxy resins.

The wheel portions 12 and 14 jointly define a central opening 36, and in the preferred construction means is provided for reinforcing the walls or wheel portions 12 and 14 about the opening 36 such that can additionally serve the purpose for mounting the assembly 10 upon the axle or spindle of the automobile or the like in the conventional manner. Such means preferably comprise a pair of annular metallic plates 38 and 40 disposed upon opposite sides of the wheel portions 12 and 14 about the opening 36, and conventional fastening means such as those indicated at 42 are circumferentially spaced about the opening 16 and extended through the annular metallic rings or attachment plates 38 and 40 through the wheel portions 12 and 14 disposed therein to retain such elements in assembled relationship. Though not shown, additional openings can be circumferentially spaced through the structure about the circumferential extents of the annular rings or mounting plates 18 and 20 whereby the assembly 10 can be mounted upon the threaded studs conventionally provided in the wheel mounting structure of automobiles.

In the preferred construction, the adjacent faces of the wheel portions 12 and 14 are securely bonded to each other throughout their radial and circumferential extents along the plane of their juncture indicated at 44; however, such is not absolutely necessary inasmuch as circumferentially spaced fastening means, not shown, can be applied through such members adjacent their radially outermost peripheries to hold such members against separation, as will be readily appreciated. Whatever means that may be provided for securing the wheel portions 12 and 14 together, it will be evident that such means serve to prevent radial movement of air between the plates or wheel portions 12 and 14.

Integral with the wheel portions 12 and 14 are oppositely extending rim flanges or semi-rims 46 and 48, such rim flanges 46 and 48 constituting continuations of the portions 12 and 14 with which they are integrally formed, it being noted that the laminations 16–34 extend thereinto. The semi-rims or rim flanges 46 and 48 are as shown of substantial wall thickness so as to be sufficient in themselves insofar as strength and resilient rigidity are concerned to be the full equivalent for their functional purposes to the conventional steel wheel rims conventionally employed for automotive wheels for the mounting of pneumatic tires.

Directing attention principally to FIGURE 2 of the drawings, it will be seen that the rim flanges 46 and 48 jointly define a contour generally conformable to a torus disposed about the circumferential periphery of the wheel portions 12 and 14. In other words, the radially outward surfaces of the rim flanges 46 and 48 generally define a surface of revolution that is concave along the axial extent of the wheel 10.

A tire body or carcass is designated generally at 50 having a central or radially outermost portion 52 and sidewall portions 54 and 56 contiguous thereto that merge with and are secured to the remote or outer marginal edges 58 and 60 of the rim flanges 46 and 48, respectively. The tire body or carcass 50 throughout the transverse extent of the tire is constituted of superposed layers of fabric ply material such as the layers indicated at 62 and 64, such layers of fabric ply material being, as is conventional, impregnated with a sealing and bonding elastomeric material such as indicated at 66 which serves additionally to bond the layers 62 and 64 together.

The fabric ply material layers 62 and 64 can be constituted of any material such as is conventionally used for such purposes in pneumatic tires, such as cotton, rayon and nylon. Such fabric ply material can and is preferably in the practice of the present invention comprised of woven glass fibers in the interest of achieving a high degree of resilience, strength and resistance to any deleterious effects that may be caused by high temperatures or stresses. Notwithstanding such indicated preference, it will be understood that substantial benefit can be realized in the practice of the present invention when using any other form of natural or synthetic fibers in a woven form to constitute a fabric or textile for the formation of the superposed and bonded layers or plies 62 and 64. It will be evident that a greater or lesser number of such ply layers can be employed than shown if desired, and it is only essential in the practice of this invention that at least one of such layers be employed.

The layers of fabric ply material 62 and 64 are extended around the extents of the sidewalls 64 and 66 and extend into and are embedded within cured resin material of the semi-rims or rim flanges 24 and 26 to overlap one or more of the laminations 16–44 therein. It will thus be seen that the tire carcass or tire body 50 jointly with the rim flanges 46 and 48 jointly define a torus-shaped space 70 within which air is confined under pressure when the pneumatic tire portion of the construction 10 is inflated. The introduction of air is accomplished through a conventional valve, not shown, in the rim flange 46. The internal surfaces of the torus-shaped surface defined by the tire carcass or body 50 and the rim flanges 46 and 48 are lined with a layer 72 of an elastomeric material generally in the nature of conventional innertubes and which may be made of the same character of materials employed therefor such as natural soft rubber or synthetic materials of similar characteristics such as butyl rubber.

An elastomeric tire tread material 74 of conventional character is bonded or vulcanized about the external surface of the tire carcass or tire body 50, such material 74 being applied as a relatively thin layer as indicated at 76 and 78 about the sidewall portions 54 and 56 as shown, and with such tread material 74 being extended about and bonded to the outer peripheral margins of the rim flanges 46 and 48 as indicated at 80 and 82. The tread material 74 is applied, as is conventional, in substantially increased thickness to the central portion 52 of the tire body 50 as indicated at 86, preferably with tread grooves 88 formed therein.

An annular sheet of fabric ply material 90 generally similar in character to the material employed for the layers 62 and 64 or for the laminations 16–34 is superposed over overlapping extents of the laminations 16–24 and 62 and 64, with such sheet 90 extending from well within the rim flange 46 to well into the sidewall 54. More than one sheet 90 can be employed if desired, it being understood that the sheet or sheets 90 are securely bonded by the resin to the ply layers 66 and 64 and also to the laminations 16–24. A sheet or sheets 92 corresponding to the sheet or sheets 90 are incorporated in a like manner in the rim flange 48 and the sidewall 56.

It is preferred that the reinforcing layers of fabric ply material 90 and 92 extend from within and from the outermost extremities of the rim flanges 46 and 48 well up into the sidewalls 54 and 56 toward the central portion 32 of the tire body 30. The annular shaped sheets of fabric ply material 90 and 92 greatly reinforce the strength of the structure and particularly reinforce the integral construction of the tire body 50 and the rim structures 46 and 48, and at the same time substantially strengthen the tire construction 10 against stresses imposed tangentially as when the tire is employed to rapidly accelerate or decelerate a vehicle on which it may be mounted. Inasmuch as the preferred method of fabricating the structure 10 involves the layers 62 and 64 being circumferentially discontinuous in the region at which they approach the rim flanges 46 and 48, the layers 90 and 92 overcome the weakness that would otherwise result. Though only one of each of the layers 90 and 92 is shown in conjunction with each of the rim flanges 46 and 48, it will be understood that a plurality of superimposed layers of such material can be employed.

Attention is now directed to FIGURES 4 through 9 for an appreciation of the preferred and novel method for making the structure 10.

Directing initial attention to FIGURES 4 through 6, the reference numeral 94 designates schematically a mold or form (which may be a conventional, radially collapsible type) having preferably though not necessarily a convex circumferential external surface 96 upon which are superimposed a plurality of layers 98 of fabric ply material such as to ultimately constitute the layers of such material designated at 62 and 64 in FIGURE 2. Such layers of fabric ply material 98 extend as clearly indicated at 100 and 102 in opposite directions from the surface 96 of the mold 94. The axial extents of the layers 98 coinciding with the axial extent of the surface 96 are impregnated with, coated and bonded together by a sealing elastomeric material 103 such as neoprene, latex rubber, silicone rubber or butyl rubber. The layers 98 can of course be sealed and bonded together by any other materials or methods of common knowledge to those well versed in the art.

As clearly shown in FIGURE 5, the axial extents 100 and 102 of the layers of ply fabric 98 applied about the mold 94 are notched as indicated at 104 and 106, with the notches of the various layers 98 of such material being staggered with respect to each other as best shown in FIGURES 5 and 6. The notching is provided so that the individual layers 98 of ply fabric can be formed from flat sheet material or from cylindrically woven stock material and so that when the portions 100 and 102 are bent about to conform with the configuration of the sidewalls of the finished product 10 such portions 100 and 102 along their circumferential extents will not be gathered, bunched or excessively overlapped or pleated. Alternatively, it will be appreciated that the individual layers can if desired be specially woven or knitted so as to conform more readily to their finally desired configuration in the construction 10, in which event the desirability of the notching 104 and 106 is not required. Each of the various layers 98 can be separate or distinct, or can be a single continuous length of fabric wound circumferentially about the mold 94 in the form of a spiral, with the same being wound about the mold 94 by a number of turns equal to the number of plies desired. This latter method of building up the layers 98 of ply fabric is applicable to the use of flat sheet fabric or textile material or to specially formed, woven or knitted fabric. Preferably the central portions of the fabric layers 98 are impregnated with the elastomer 103 prior to application to the mold 94. It will be appreciated as previously indicated that although the mold 94 is illustrated as a solid body, the same may be of the radially expansible or collapsible type, whereby the bonded and sealed together fabric layers 74 can be readily disengaged therefrom, and whereby a substantially greater degree of convexity can be given the surface 72 of the mold. It is of course possible if desired to employ a common form of cylindrical drum mold in lieu of the convex mold 94 illustrated, in which event conventional processing techniques well known in the tire manufacturing art can be applied to convert the layers 98 after removal from the mold to the configuration shown in FIGURE 7 as will be plain.

The elastomeric material 103 with which the ply layers 74 are impregnated and sealed together can be such as to be curable upon the application of heat or include a setting agent so as to achieve a desired degree of strength within a short period of time after the fabric and the materials constituting the fabric layers 98 have been applied to and formed on the mold 94. It will be understood from the foregoing that the axial extents of the ply fabric material coincident with the axial extent of the mold 94 can be impregnated with the elastomeric material prior to applying the same along with additional bonding or sealing agent as may be necessary to the mold 94. For example, such axial extent of the ply fabric can be impregnated with settable silicone rubber prior to the application of the fabric to the mold 94 with additional settable silicone rubber being applied between such layers at the time the layers of impregnated fabric are applied to the mold 94.

Figure 7:
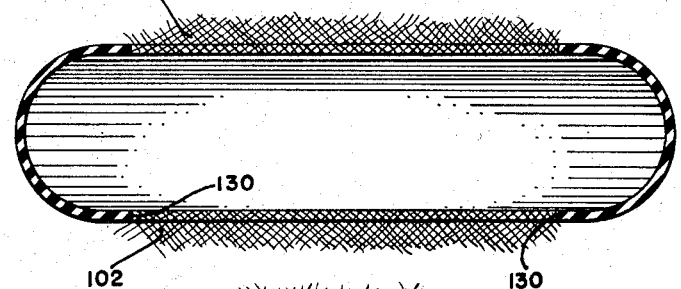
FIGURE 7 is a transverse vertical view taken upon the plane of the axis of the structure resulting from removal of the superposed and bonded fabric ply materials shown in FIGURE 4 from the mold or form.

After the layers of ply fabric 98 have been suitably sealed and bonded together with the elastomeric material 103, impregnating and sealing the same together has set, the resulting formed structure can be removed from the mold 70 (or the latter collapsed as indicated previously and removed from within the structure), with the resulting product having the general appearance shown in central cross section taken upon the plane of the axis thereof shown in FIGURE 7. The extending fabric portions 100 and 102 can be preserved intact in their woven condition or frayed (as can optionally be the case, it being noted that the notching facilitates such fraying or unravelling) as suggested in FIGURES 7 and 8. The step of fraying is entirely optional and can be omitted if desired.

A male mold member preferably made of steel is provided such as that indicated at 110 in FIGURE 8. The upper surface of the male mold member includes a flat central portion 112 surrounding an upstanding central boss 114 that respectively defines in the final product the outer surface of the wheel plate 14 and the wheel opening 36. Additionally, the height of the boss 114 fixes the axial spacing of the male mold 110 from a female mold 116. The upper surface of the male mold also includes a generally frusto-conical portion 118 that at its outer periphery terminates in a curved portion 120. The portions 118 and 120 serve to define in the final product the outer surfaces of the rim flange 48 and a connecting extent of the sidewall of the tire.

Initially the upper surfaces 112, 118 and 120 are coated with a suitable parting compound such as silicone grease and over such parting compound is applied a coating of a curable resin 122, after which one or more annular sheets or layers of fabric ply material 124 are alternately applied with additional resin 122 over the surfaces 112, 118 and 120.

The sheet or sheets of fabric 124 are preferably woven of fibers of glass, though conventional fabrics suitable for the forming of tire ply can be used. The annular sheet or sheets 124 can be loomed if desired as a tight weave to conform to the configuration of the surfaces 112, 118 and 120, or alternatively, the annular sheet or sheets 124 can be of flat annular configuration of sufficiently soft or loose weave as to be pressable upon the surfaces 112, 118 and 120 to conform thereto in configuration without wrinkling or pleating.

The extended portions 102 of the fabric layers 98 are also dressed, whether frayed or notched woven fibers, with additional resin 122 to fill and constitute a solid mass therewith, over the surface 120 and preferably at least a portion of the surface 118 so as to radially overlap and be bonded as a compact mass to the layer or layers 124. The material portions 102 can be extended to cover a portion of the mold surface 112 if desired. It will be understood that the dressing of portions 102 will be as uniformly distributed circumferentially as possible so as to have the central axis of the mold 110 as an axis of symmetry. Also the parts of the portions 102 radially inward of the layer 124 are preferentially dressed to extend toward the axis of the mold 110.

When a plurality of layers 124 are employed, it is preferred that such layers 124 be interdigitated with successively applied parts of the portions 102, it being noted that normally the portions 102 are in themselves extensions of a plurality of ply layers 98.

When only one layer 124 is employed, it is preferred that it be interposed between the mold 110 and all the portions 102; however, such is not essential and such one layer 124 can overlie all or be disposed between parts of such portions 102.

The hereinbefore described application of the ply portions 102, the layer or layers 124 and the resin 122 can be readily applied from above (as viewed in FIGURE 8) through the ample space between the free ends of portions 100 of the ply material layers 98.

After such application with the resin being extended radially outward to the edge 120 of the elastomer 103 bonded layers 98 (such edge 130 overlying the mold surface 120 as shown), the female mold 116 having an under surface 132 generally similar to the surfaces 112, 118 and 120 is positioned as shown in FIGURE 8 and pressed downward upon the boss 114 of the mold 110. The height of the boss 114 fixes the spacing of the surface 143 (previously coated with a parting agent) from the surfaces 112, 118 and 120. The amount or volume of resin 122 previously applied is controlled so that the same together with the tire body marginal portion at the edge 130, the portions 102 and the layers 124 at least completely fill the space between the surface 132 and the surfaces 112, 118 and 120. Any excess resin 122 can be wiped from about the peripheries of the mold members 110 and 116 prior to the resin 122 setting or hardening. The peripheral margin of the elastomer 103 bonded ply layers 98 along the edge 130 constitutes, as will be appreciated, such a seal that a substantial pressure can be exerted on materials confined within the space between mold members 110 and 116, whereby a good contact and exclusion of voids is facilitated.

After the resin 122 has cured, or hardened, the mold members 110 and 116 are removed and an opening 136 is made therethrough and the previously formed half of the tire structure is seated in mold member 140 having an annular groove or trough 142 therein, after the mold member has been coated with a parting compound to prevent adherence to the product.

An annular tube 144 generally similar to conventional inner tubes and which can be made of such conventional materials such as butyl rubber, latex rubber, etc., is disposed in deflated or near deflated condition within the previously formed half of the tire and a valve fitting 146 with which the tube 144 is provided is extended to project through the opening 136 so as to communicate with an opening 148 in the mold member 140. Preferably a curable sealing agent such as commercially available forms of silicone rubber, or the like is applied about the air tube or valve fitting 146 to form a bonded seal with the portion of the tire through which the opening 136 extends. The arrangement is such that air and desired fluid can be forced through the opening 148 to inflate the tube 144.

If desired the external surface of the tube can be coated with any suitable form of curable cement or bonding agent so that the tube 140 will constitute an integral portion of the completed product.

After the tube 144 has been arranged as described above with respect to the mold member 140, the tube 144 is partially inflated to be nearly but preferably slightly smaller in size than it will be in the final product. The flat side 150 of the structure formed thus far is coated or not coated with a parting agent depending, as will be understood, on whether it is desired that the wheel plates 12 and 14 in the final product are to be bonded together or to be separable.

The portions 100 of the elastomer 103 bonded ply layers 98 are along with resin 152 dressed over the side of the tube 144 remote from the mold member 140 to extend a comparable distance toward the axis of the mold member 140 as do the previously described portions 102 now embedded in and bonded by resin 122. In addition, layers of annular fabric 154 along with resin 152 are applied over the surface 150 and over the tube 144 so as to overlap the fabric portions 100. The application of the fabric portions 100 and the layers of fabric material 154 are with the resin 152 (preferably, though not necessarily) applied in such a manner and sequence so as in the final product to have the surface 150 as a plane of symmetry. Obviously, the fabricator in the practice of the method is as free in the exercise of his preference for the sequencing or ordering of the various layers of fabric as indicated previously with respect to forming the other side of the combined wheel and tire.

Thereafter, the previously described male mold member 110 is positioned as shown in FIGURE 9 (the same having its surfaces coated with a suitable parting compound), and the mold members 140 and 110 are pressed together until the boss 114 engages the mold member 140 as shown. Then, air or any suitable fluid is applied under pressure through the opening 148 in the mold member 140 to inflate the tube 144 under a superatmospheric pressure, preferably a pressure in excess of 100 pounds per square inch, though lower pressures may be employed if desired. During such pressure inflation of the tube 144, any suitable means, not shown, are employed to prevent separation of the mold members 110 and 140. The quantity of resin 152 applied is preferably of such predetermined quantity so as to fill the space between the mold members 110 and 140 to the extent shown in FIGURE 9.

As will be evident, care must be exercised during placement of the mold member 110 so as to prevent the inclusion of air pockets. If desired, a slight excess of resin 152 can be applied and the mold members 110 and 140 be reciprocated a short distance towards and away from each other prior to seating the boss 114 against the mold member 140 with alternate application and relief of air or fluid pressure within the tube 114 so as to tend to cause excess resin as well as any pockets of included air to migrate radially outward to the outside of the mold members 110 and 140. Also, the mold member 140 can have its outer peripheral undersurface 160 slightly spaced from the mold member 110 when the boss 114 engages the center of the mold member 140 so that air can be free at all times to migrate radially outward from between the mold members. Of course the gap between the mold members 110 and 140 about their peripheries must be sufficiently small so as to prevent any damaging extrusion of the already formed portion of the tire therebetween by reason of the fluid pressure existing within the tube 144.

After the resin 152 has cured or set, which curing or setting can if desired be accelerated by placing the structure shown in FIGURE 9 within a suitable oven, the mold members 110 and 140 are removed from the product as thus far formed.

Finally the molded structure shown in FIGURE 9 has the tread rubber 74 molded and vulcanized thereon by conventional procedures to result in the final product disclosed in FIGURES 1, 2 and 3.

The illustrated and described product as well as the illustrated and described preferred method for making the product are subject to numerous variations in detail without departing from the spirit of the invention and accordingly, attention is directed to the appended claims in order to ascertain the actual scope of the invention.

I claim:

1. An integral pneumatic tire and wheel construction comprising an annular wheel having an integral peripheral rim, said wheel and rim consisting of laminations of fabric material bonded with a resin material and being of sufficient strength and resilient rigidity to support substantial radial and axial loads presented thereto, said rim including opposite and laterally extending portions generally conformable in configuration to a torus embracing the wheel and terminating in marginal edges, an annular tire body constituted of fabric ply layers embedded in and bonded to elastomeric sealing material, said tire body being C-shaped in section and having marginal edge portions, said marginal edge portions of the tire body abutting the marginal edges of the rim whereby the tire body and the rim generally conform to the torus and enclose a torus shaped space in an airtight fashion, said fabric ply of the tire body being extended from each of the abutting marginal edge portions of the latter and being securely embedded in and bonded to the resin material of the oppositely extending portions of the rim in overlapping relationship with the laminations of fabric material, and an elastomeric tire tread material bonded on the radially outermost side of the tire body.

2. The combination of claim 1, wherein the fabric ply of the tire body and the laminations are of fibers made of a material selected from the group consisting of glass, nylon, polyester, rayon, cotton, metal, and mixtures thereof.

3. The combination of claim 1, wherein the resin material is selected from the group consisting of epoxy resin, hard rubber, polycarbonate, high density polyester, urea-formaldehyde, high density polyhalocarbons, high density polyamide, and mixtures thereof.

4. The combination of claim 1, including a lamination of fabric embedded in and bonded to the resin material and also overlapping both the fabric ply and the laminations of fabric.

5. The combination of claim 1, wherein said fabric ply and said laminations include woven fiber glass.

6. The combination of claim 1, wherein the tire tread elastomeric material is bonded to the entire exterior of the tire body and is extended to overlap and is bonded to the rim.

No references cited.

ARTHUR L. LA POINT, *Primary Examiner.*